United States Patent
Ragupathi et al.

(10) Patent No.: US 10,095,290 B2
(45) Date of Patent: Oct. 9, 2018

(54) SYSTEMS AND METHODS FOR THERMAL CONTROL SUPPORT FOR PREDECESSOR INFORMATION HANDLING SYSTEMS

(71) Applicant: Dell Products L.P., Round Rock, TX (US)

(72) Inventors: Dinesh Kunnathur Ragupathi, Round Rock, TX (US); Sundar Dasar, Round Rock, TX (US); Robert Daniel Whittington, Austin, TX (US); Kala Sampathkumar, Bangalore (IN); Sridevi Chandrasekaran, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 304 days.

(21) Appl. No.: 15/163,068

(22) Filed: May 24, 2016

(65) Prior Publication Data
US 2017/0344085 A1 Nov. 30, 2017

(51) Int. Cl.
*G05B 19/406* (2006.01)
*G06F 1/20* (2006.01)

(52) U.S. Cl.
CPC ........... *G06F 1/206* (2013.01); *G05B 19/406* (2013.01); *G05B 2219/49219* (2013.01)

(58) Field of Classification Search
None
See application file for complete search history.

(56) References Cited

U.S. PATENT DOCUMENTS

2014/0192475 A1* 7/2014 Tunks ............... H05K 7/20836
361/679.31
2016/0274629 A1* 9/2016 Lovicott ............... G06F 1/206

* cited by examiner

*Primary Examiner* — Ryan Jarrett
(74) *Attorney, Agent, or Firm* — Jackson Walker L.L.P.

(57) ABSTRACT

A method may include, responsive to determining that the earlier-generation information handling system includes the information handling resource for which a second thermal table of the second management controller requires updated thermal control parameters for thermal control of the information handling resource: (i) reading from a first thermal table of the first management controller an entry associated with the information handling resource and a second information handling system including thermal control parameters for thermal control of the information handling resource by the second information handling system; and (ii) communicating from the first management controller to the second management controller the thermal control parameters for thermal control of the information handling resource by the second information handling system in order to update the second thermal table with the thermal control parameters.

18 Claims, 4 Drawing Sheets

| PCI CARD DETAIL | | CURRENT GENERATION | CARD THERMAL RESPONSE | | PREDECESSOR THERMAL TRANSFORMATION (SEND) | | SUCCESSOR THERMAL TRANSFORMATION (ACCEPT) |
|---|---|---|---|---|---|---|---|
| DESCRIPTION | CARD ID | MODEL | TIER | LFM/CFM | MODEL | IDRAC FW VERSION | SOURCE REFERENCE (FROM WHERE TRANSFORMATION GOT) |
| GPU | 1111 | 14G: R740 | 5 | 125 | | | |
| | | | 3 | 100 | R730 | | |
| | | | 7 | 175 | R720 | | |
| | | | 7 | 175 | R720 | 2.00.00.00 | |
| | | | 3 | 75 | R730 | 2.10.10.10 | |
| | | | 2 | 85 | R730 | 2.22.22.22 | |
| | | | 2 | 85 | R730 | 2.30.30.30 | |
| 15G GPU | 2222 | | 10 | 500 | | | 15G IDRAC FW: 4.0.0.0 MODEL: R750 |

SYSTEMS AND METHODS FOR THERMAL CONTROL SUPPORT FOR PREDECESSOR INFORMATION HANDLING SYSTEMS

TECHNICAL FIELD

The present disclosure relates in general to information handling systems, and more particularly to systems and methods for providing thermal control support for processor information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Often, the temperatures of these components need to be kept within a reasonable range to prevent overheating, instability, malfunction and damage leading to a shortened component lifespan. Accordingly, air movers (e.g., cooling fans and blowers) have often been used in information handling systems to cool information handling systems and their components.

One challenge in the industry is providing power and thermal budget support of third-party information handling resources in an information handling system. In many instances, power and thermal budget support is provided to a handful of "approved" or "verified" information handling resources in power and thermal budget tables stored in a management controller or other information handling resource. However, once a version of management controller firmware is released, additions to the power or thermal budget tables to add support for another information handling resource (e.g., a Peripheral Component Interconnect-Extended or "PCIe" card) may require reconfiguration or recompilation of management controller firmware. Thus, any unsupported "off-the-shelf" information handling resources added by a customer after delivery may be assigned default parameters with respect to power and thermal budgeting rather than having customized parameters, which may lead to suboptimal performance.

SUMMARY

In accordance with the teachings of the present disclosure, the disadvantages and problems associated with thermal control in information handling systems may be substantially reduced or eliminated.

In accordance with embodiments of the present disclosure, an information handling system may include a processor and a management controller communicatively coupled to the processor, and having stored thereon a thermal table and firmware. The thermal table may comprise parameters for thermal management of one or more information handling resources of the information handling system and one or more information handling resources of at least one other information handling system. The firmware may comprise instructions executable on the management controller and configured to communicate an inquiry to a second management controller of an earlier-generation information handling system communicatively coupled to the management controller via a network to determine if the earlier-generation information handling system includes an information handling resource for which a second thermal table of the second management controller requires updated thermal control parameters for thermal control of the information handling resource, and responsive to determining that the earlier-generation information handling system includes the information handling resource for which a second thermal table of the second management controller requires updated thermal control parameters for thermal control of the information handling resource: (i) read an entry from the thermal table associated with the information handling resource and a second information handling system including thermal control parameters for thermal control of the information handling resource by the second information handling system; and (ii) communicate the thermal control parameters for thermal control of the information handling resource by the second information handling system to the second management controller in order to update the second thermal table with the thermal control parameters.

In accordance with these and other embodiments of the present disclosure, a method may include communicating an inquiry from a first management controller of a later-generation information handling system to a second management controller of an earlier-generation information handling system communicatively coupled to the first management controller via a network to determine if the earlier-generation information handling system includes an information handling resource for which a second thermal table of the second management controller requires updated thermal control parameters for thermal control of the information handling resource. The method may also include, responsive to determining that the earlier-generation information handling system includes the information handling resource for which a second thermal table of the second management controller requires updated thermal control parameters for thermal control of the information handling resource: (i) reading from a first thermal table of the first management controller an entry associated with the information handling resource and a second information handling system including thermal control parameters for thermal control of the information handling resource by the second information handling system; and (ii) communicating from the first management controller to the second management controller the thermal control parameters for thermal control of the information handling resource by the second information handling system in order to update the second thermal table with the thermal control parameters.

In accordance with these and other embodiments of the present disclosure, an article of manufacture may include a non-transitory computer readable medium and computer-executable instructions carried on the computer readable medium, the instructions readable by a processor. The instructions, when read and executed, may cause the processor to communicate an inquiry from a first management controller of a later-generation information handling system to a second management controller of an earlier-generation information handling system communicatively coupled to the first management controller via a network to determine if the earlier-generation information handling system includes an information handling resource for which a second thermal table of the second management controller requires updated thermal control parameters for thermal control of the information handling resource. The instructions may also cause the processor to, responsive to determining that the earlier-generation information handling system includes the information handling resource for which a second thermal table of the second management controller requires updated thermal control parameters for thermal control of the information handling resource: (i) read from a first thermal table of the first management controller an entry associated with the information handling resource and a second information handling system including thermal control parameters for thermal control of the information handling resource by the second information handling system; and (ii) communicate from the first management controller to the second management controller the thermal control parameters for thermal control of the information handling resource by the second information handling system in order to update the second thermal table with the thermal control parameters.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages; electro-mechanical devices (e.g., air movers), displays, and power supplies.

Figure 1:
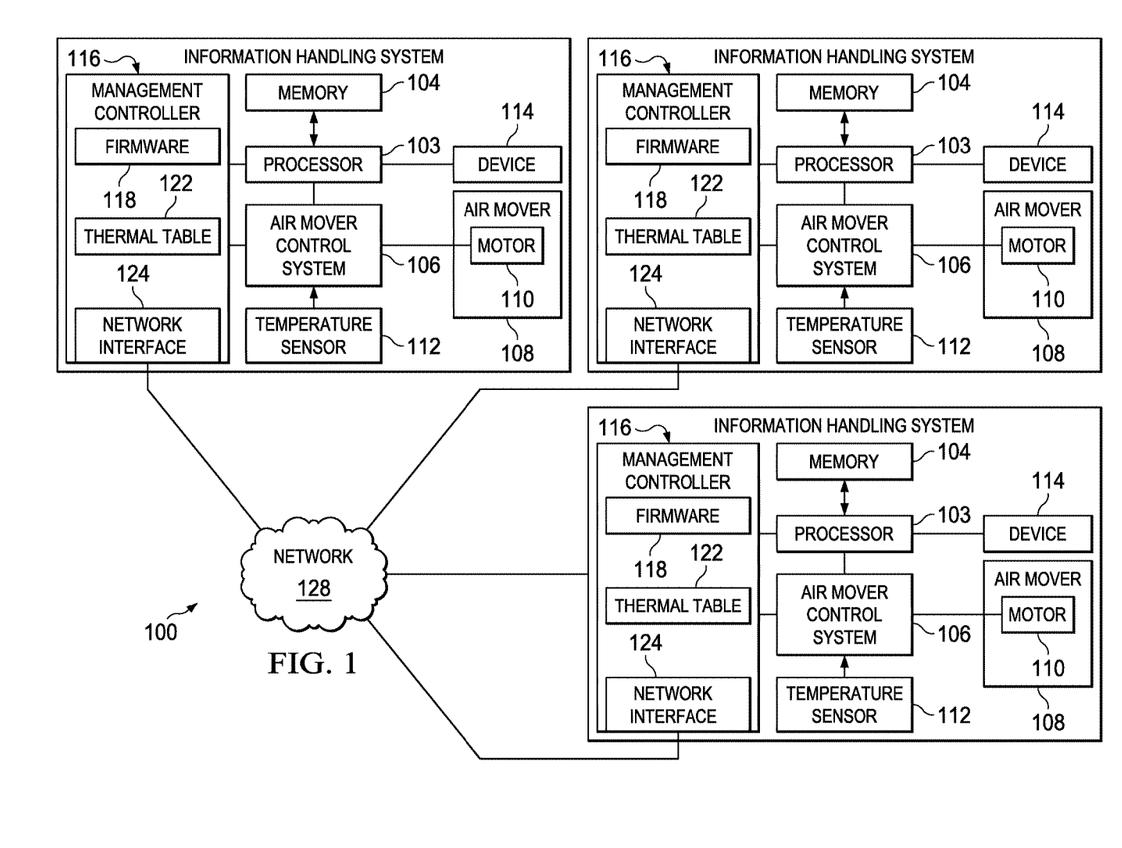
FIG. 1 illustrates a block diagram of an example system comprising a plurality of networked information handling systems, in accordance with the present disclosure.

FIG. 1 illustrates a block diagram of an example system 100 comprising a plurality of networked information handling systems 102, in accordance with the present disclosure. As shown in FIG. 1, system 100 may include a plurality of information handling systems 102 networked to one another via a network 128. For example, information handling systems 102 may reside in one or more enclosures, racks, and/or chassis, located in one or more data centers.

In some embodiments, an information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data. As shown in FIG. 1, an information handling system 102 may comprise a processor 103, a memory 104 communicatively coupled to processor 103, an air mover control system 106 communicatively coupled to processor 103, an air mover 108 communicatively coupled to air mover control system 106, a temperature sensor 112 communicatively coupled to air mover control system 106, one or more devices 114 communicatively coupled to processor 103, and a management controller 116 communicatively coupled to processor 103.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102. Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCM-CIA card, flash memory, magnetic storage, opto-magnetic storage, or any suitable selection and/or array of volatile or non-volatile memory that retains data after power to information handling system 102 is turned off.

Air mover control system 106 may be communicatively coupled to processor 103 and may include any system, device, or apparatus configured to receive one or more signals indicative of one or more temperatures within information handling system 102 (e.g., one or more signals from one or more temperature sensors 112), receive information regarding thermal parameters of information handling resources (e.g., information from power and/or thermal tables of management controller 116) and based on such signals and thermal parameters, calculate an air mover driving signal to maintain an appropriate level of cooling, increase cooling, or decrease cooling, as appropriate, and communicate such air mover driving signal to air mover 108. Although FIG. 1 depicts air mover control system 106 external to and independent from management controller 116, in some embodiments, air mover control system 106 may be integral to management controller 116 (e.g., embodied in firmware 118 of management controller 116).

Air mover 108 may be communicatively coupled to air mover control system 106, and may include any mechanical or electro-mechanical system, apparatus, or device operable to move air and/or other gases. In some embodiments, air mover 108 may comprise a fan (e.g., a rotating arrangement of vanes or blades which act on the air). In other embodiments, air mover 108 may comprise a blower (e.g., a centrifugal fan that employs rotating impellers to accelerate air received at its intake and change the direction of the airflow). In these and other embodiments, rotating and other moving components of air mover 108 may be driven by a motor 110. The rotational speed of motor 110 may be controlled by the air mover control signal communicated from air mover control system 106. In operation, air mover 108 may cool information handling resources of information handling system 102 by drawing cool air into an enclosure housing the information handling resources from outside the chassis, expel warm air from inside the enclosure to the outside of such enclosure, and/or move air across one or more heatsinks (not explicitly shown) internal to the enclosure to cool one or more information handling resources.

A temperature sensor 112 may be any system, device, or apparatus (e.g., a thermometer, thermistor, etc.) configured to communicate a signal to air mover control system 106 indicative of a temperature within information handling system 102.

For ease of exposition, FIG. 1 depicts only one each of air mover control system 106, air mover 108, and temperature sensor 112. However, it is noted that information handling system 102 may include two or more air movers 108 and each such air mover 108 may have a dedicated respective air mover control system 106. It is further noted that an air mover control system 106 may receive temperature signals from one or more temperature sensors 112, and that a single temperature sensor 112 may communicate temperature signals to one or more air mover control systems 106.

Device 114 may be communicatively coupled to processor 103 and may generally include any information handling resource. In some embodiments, device 114 may comprise a PCIe device.

Management controller 116 may be configured to provide out-of-band management facilities for management of information handling system 102. Such management may be made by management controller 116 even if information handling system 102 is powered off or powered to a standby state. Management controller 116 may include a processor, memory, out-of-band network interface separate from and physically isolated from an in-band network interface of information handling system 102, and/or other embedded information handling resources. In certain embodiments, management controller 116 may include or may be an integral part of a baseboard management controller (BMC) or a remote access controller (e.g., a Dell Remote Access Controller or Integrated Dell Remote Access Controller). In other embodiments, management controller 116 may include or may be an integral part of a chassis management controller (CMC).

As shown in FIG. 1, management controller 116 may include firmware 118, thermal table 122, and network interface 124. Firmware 118 may include a program of executable instructions configured to be read and executed by management controller 118 in order to carry out the functionality of management controller 118, including that functionality described herein. In some embodiments, firmware 118 may be configured to undertake a predecessor thermal control support update process, either as a source for such update process or a target for such update process, as described in greater detail below.

Thermal table 122 may comprise a map, list, array, table, or other suitable data structure with one or more entries, each entry setting forth thermal parameters (e.g., target temperatures, maximum temperatures, air mover speed curves, power capping curves for power throttling, etc.) regarding an information handling resource of information handling system 102. In particular, thermal table 122 may set forth thermal parameters for "known" or "supported" information handling resources that may be used in information handling system 102 and may be constructed and stored within a read-only memory of management controller 116 prior to runtime of information handling system 102 (e.g., during factory provisioning) that may only be updated in connection with periodic firmware updates to management controller 116, and/or in connection with a predecessor thermal control support update process as described in greater detail below.

Figure 4:
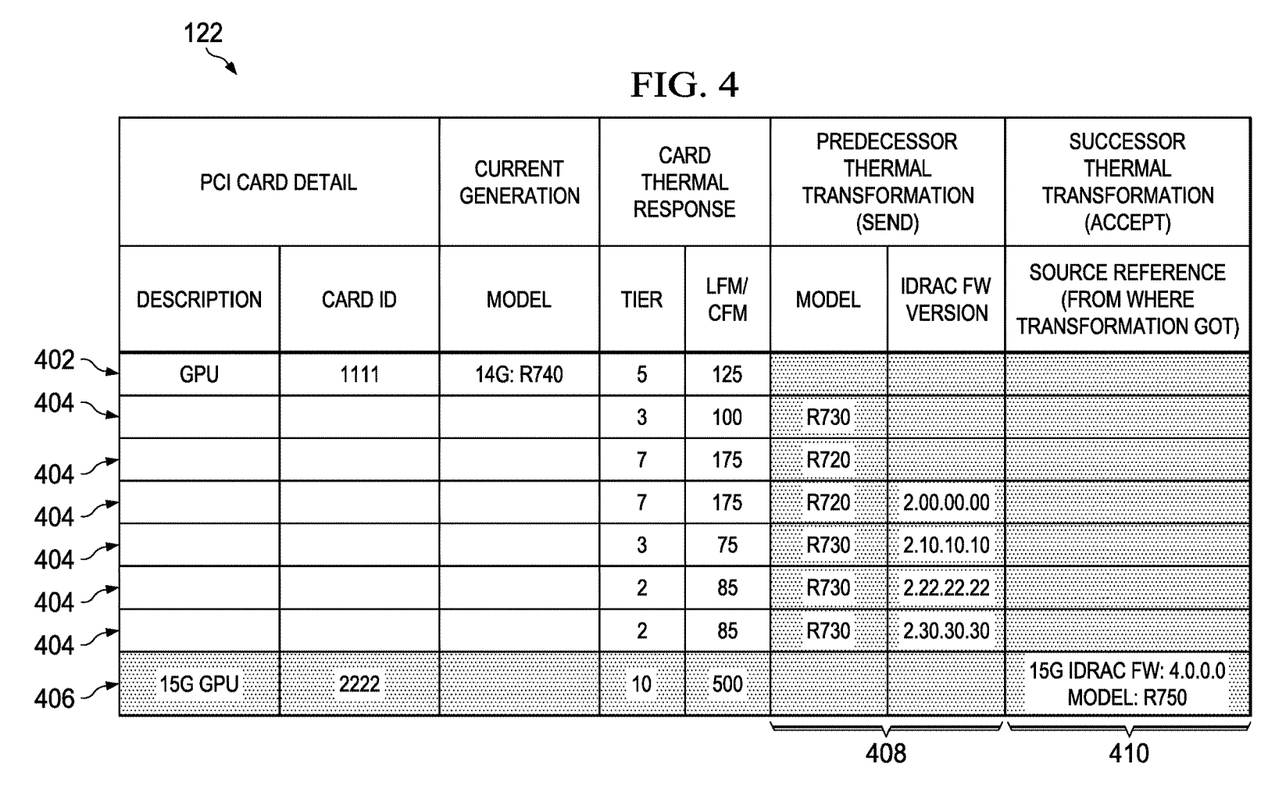
FIG. 4 illustrates an example thermal table which may be used in connection with providing thermal control support for a predecessor information handling system, in accordance with embodiments of the present disclosure.

For example, FIG. 4 illustrates an example thermal table 122. As shown in FIG. 4, thermal table 122 may include at least one entry 402 setting forth thermal parameters for "known" or "supported" information handling resources that may be used in information handling system 102. Thus, with reference to entry 402, if a GPU with card ID 1111 was present in an information handling system 102, the management controller 116 of such information handling system may apply thermal parameters set forth in entry 402.

Further, thermal table 122 may also include one or more entries 404 setting forth thermal parameters for "known" or "supported" information handling resources that may be used in a predecessor information handling system 102 to the information handling system 102 storing such thermal table 122. For example, columns 408 of entries 404 may set forth identities of predecessor information handling systems 102 to which entries 404 apply. Thus, in accordance with the methods and systems disclosed herein, an information handling system 102 may communicate information set forth in an entry 404 to a predecessor information handling system 102.

Similarly, thermal table 122 may also include one or more entries 406 setting forth thermal parameters communicated from a thermal table 122 of a successor information handling system 102. For example, column 410 of an entry 406 may set forth identities of a successor information handling system 102 from which thermal parameters in entry 406 were obtained.

Turning again to FIG. 1, network interface 124 may comprise any suitable system, apparatus, or device operable to serve as an interface between management controller 116, one or more other management controllers 116, and/or one or more other information handling systems (e.g., via network 128). Network interface 124 may enable management controller 116 to communicate using any suitable transmission protocol and/or standard, including without limitation those protocols and standards enumerated below with respect to network 128. In these and other embodiments, network interface 124 may comprise a network interface card, or "NIC."

In addition to processor 103, memory 104, air mover control system 106, air mover 108, temperature sensor 112, device 114, and management controller 116, information handling system 102 may include one or more other information handling resources.

Network 128 may be a network and/or fabric configured to couple information handling systems 102 to one another. In these and other embodiments, network 128 may include a communication infrastructure, which provides physical connections, and a management layer, which organizes the physical connections and information handling systems communicatively coupled to network 128. Network 128 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 128 may transmit data via wireless transmissions and/or wire-line transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 128 and its various components may be implemented using hardware, software, or any combination thereof.

In operation, one or more of information handling systems 102 may be of a later-generation than one or more other information handling systems 102. Being of a "later-generation" means that an information handling system 102, as compared to another information handling system 102, has information handling resources (e.g., management controller 116, processor 103) of a more-recent version or design, and/or software and/or firmware (e.g., firmware 118) of a newer version. To provide thermal control support for an earlier-generation information handling system 102, firmware 118 of a later-generation information handling system 102 may discover via communications over network 128 updatable thermal control parameters in thermal table 122 on the earlier-generation information handling system 102, and communicate updated thermal control parameters to the earlier-generation information handling system 102 to be stored within thermal table 122 of the earlier-generation information handling system 102.

For example, a thermal table 122 of an earlier-generation information handling system 102 may have disposed therein a device 114 (e.g., a PCIe device) for which no entry exists in the thermal table 122 of the earlier-generation information handling system 102. Accordingly, when implementing thermal control of device 114, default thermal control parameters from thermal table 122 may be applied by air mover control system 106 in order to provide "worst-case" cooling of such unknown, unsupported device 114. Because such default parameters assume worst-case cooling needs, such cooling may be sub-optimal, such as requiring more power consumption by air mover 108 than would have been the case if more optimal cooling was applied.

To remedy this disadvantage, firmware 118 of a later-generation information handling system 102 may be able to, via communications over network 128, determine when an earlier-generation information handling system 102 has installed a device 114 which is unsupported by thermal table 122, and upon making such determination, communicate an appropriate entry from its own thermal table 122 in order to update the thermal table 122 of the earlier-generation information handling system 102 to include support for the device 114.

In addition, in some embodiments, a later-generation information handling system 102 may provide updated thermal control parameters to an earlier-generation information handling system 102 for a device 114 which is already supported by an entry in the thermal table 122 of the earlier-generation information handling system 102. For instance, the device 114 may be supported via thermal control parameters present in the thermal table 122 of the earlier-generation information handling system 102, but the later-generation information handling system 102 may have updated thermal control parameters present in its thermal table 122 which may allow for more optimal operation of the device on the earlier-generation information handling system 102. Accordingly, firmware 118 of a later-generation information handling system 102 may be able to, via communications over network 128, determine when an earlier-generation information handling system 102 has installed a device 114 which is supported by thermal table 122, an entry which is updatable to include new thermal control parameters, and upon making such determination, communicate an appropriate entry from its own thermal table 122 in order to update the thermal table 122 of the earlier-generation information handling system 102 to include updated thermal control parameters for the device 114.

Figure 2:
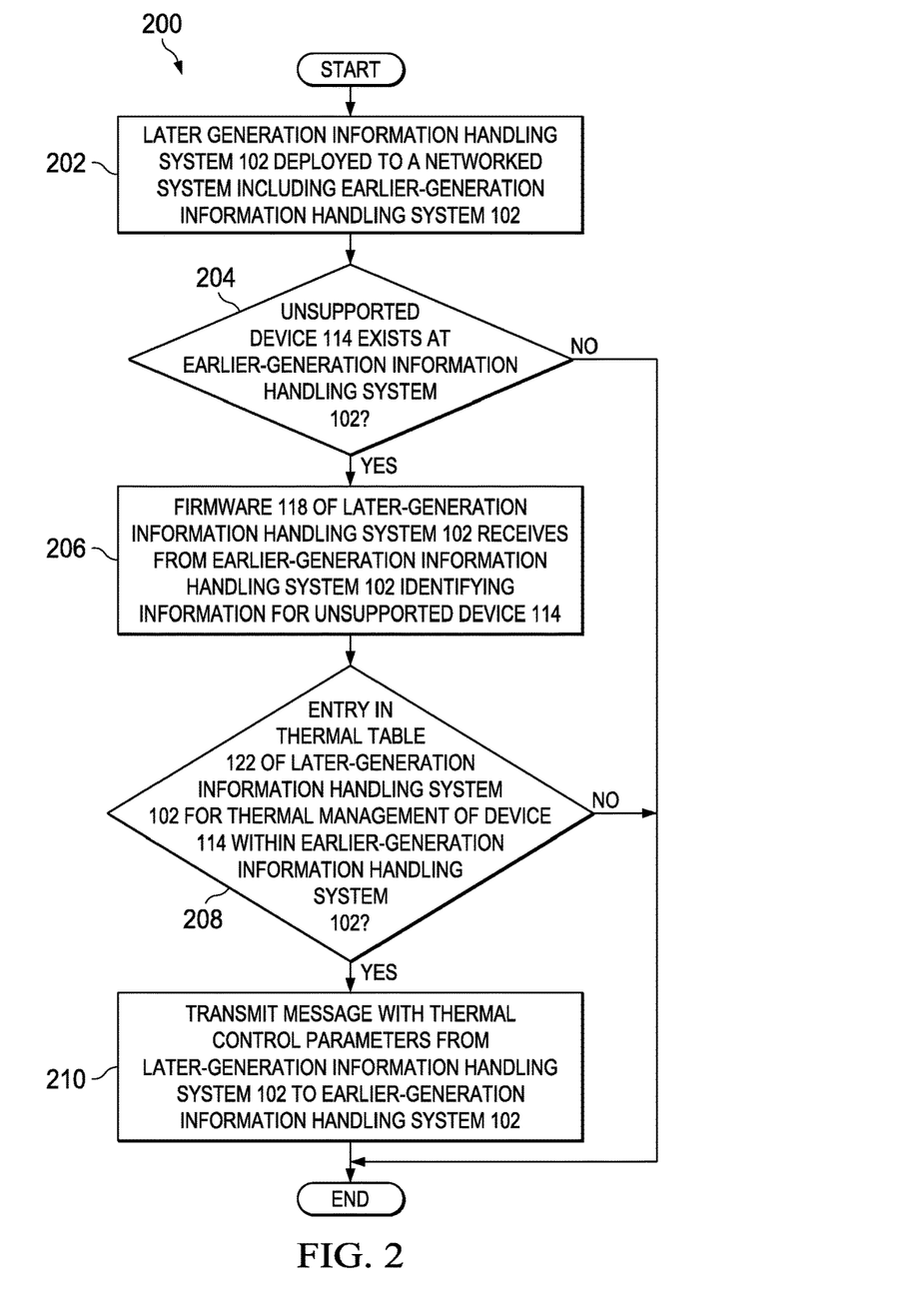
FIG. 2 illustrates a flow chart of an example method for providing thermal control support for a predecessor information handling system, in accordance with embodiments of the present disclosure.

FIG. 2 illustrates a flow chart of an example method 200 for providing thermal control support for a predecessor information handling system, in accordance with embodiments of the present disclosure. According to certain embodiments, method 200 may begin at step 202. As noted above, teachings of the present disclosure may be implemented in a variety of configurations of information handling systems 102. As such, the preferred initialization point for method 200 and the order of the steps comprising method 200 may depend on the implementation chosen. In these and other embodiments, method 200 may be implemented as firmware, software, applications, functions, libraries, or other instructions.

At step 202, a later-generation information handling system 102 may be deployed to a networked system (e.g., system 100) including at least one other earlier-generation information handling system 102. At step 204, firmware 118 of the later-generation information handling system 102 may communicate an inquiry to an earlier-generation information handling system 102 (e.g., via a management command, such as a command via Intelligent Platform Management Interface or other suitable standard or protocol) to determine whether the earlier-generation information handling system 102 includes a device 114 which is unsupported by the power table and/or thermal table 122 of earlier-generation information handling system 102 (e.g., unsupported in the sense that no entry exists for the device 114 in the power table and/or thermal table 122 of earlier-generation information handling system 102). If no unsupported devices 114 are found, method 200 may end. Otherwise, if one or more unsupported devices 114 are found, method 200 may proceed to step 206 for each such unsupported device 114.

At step 206, for each unsupported device 114, firmware 118 of the later-generation information handling system 102 may receive from the earlier-generation information handling system 102 identifying information (e.g., manufacturer, device identifier, model number, etc.) for the device 114. In some embodiments, such identifying information may be stored in a computer-readable medium integral to the device 114, which may be read by management controller 116 of the earlier-generation information handling system 102 and communicated to management controller 116 of the later-generation information handling system 102 via network 128.

At step 208, firmware 118 of the later-generation information handling system 102 may determine if it includes an entry in its own thermal table 122 for thermal management of such device 114 within the earlier-generation information handling system 102 (e.g., an entry including thermal parameters for thermal control of device 114 by information handling systems 102 of the same generation as the earlier-generation information handling system 102). If a match for the device 114 is found in the thermal table of the later-generation information handling system 102, method 200 may proceed to step 210. Otherwise, method 200 may end.

At step 210, firmware 118 of the later-generation information handling system 102 may frame a message including such thermal table 122 entry and communicate such message to the earlier-generation information handling system 102. Firmware 118 of the earlier-generation information handling system 102 may accept the message, extract the entry therefrom, store thermal parameters from the entry in its own thermal table 122, and apply the thermal parameters set forth in such entry in order to thermally control device 114. After completion of step 210, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using a management controller 116, components thereof or any other system operable to implement method 200. In certain embodiments, method 200 may be implemented partially or fully in software and/or firmware embodied in computer-readable media.

Figure 3:
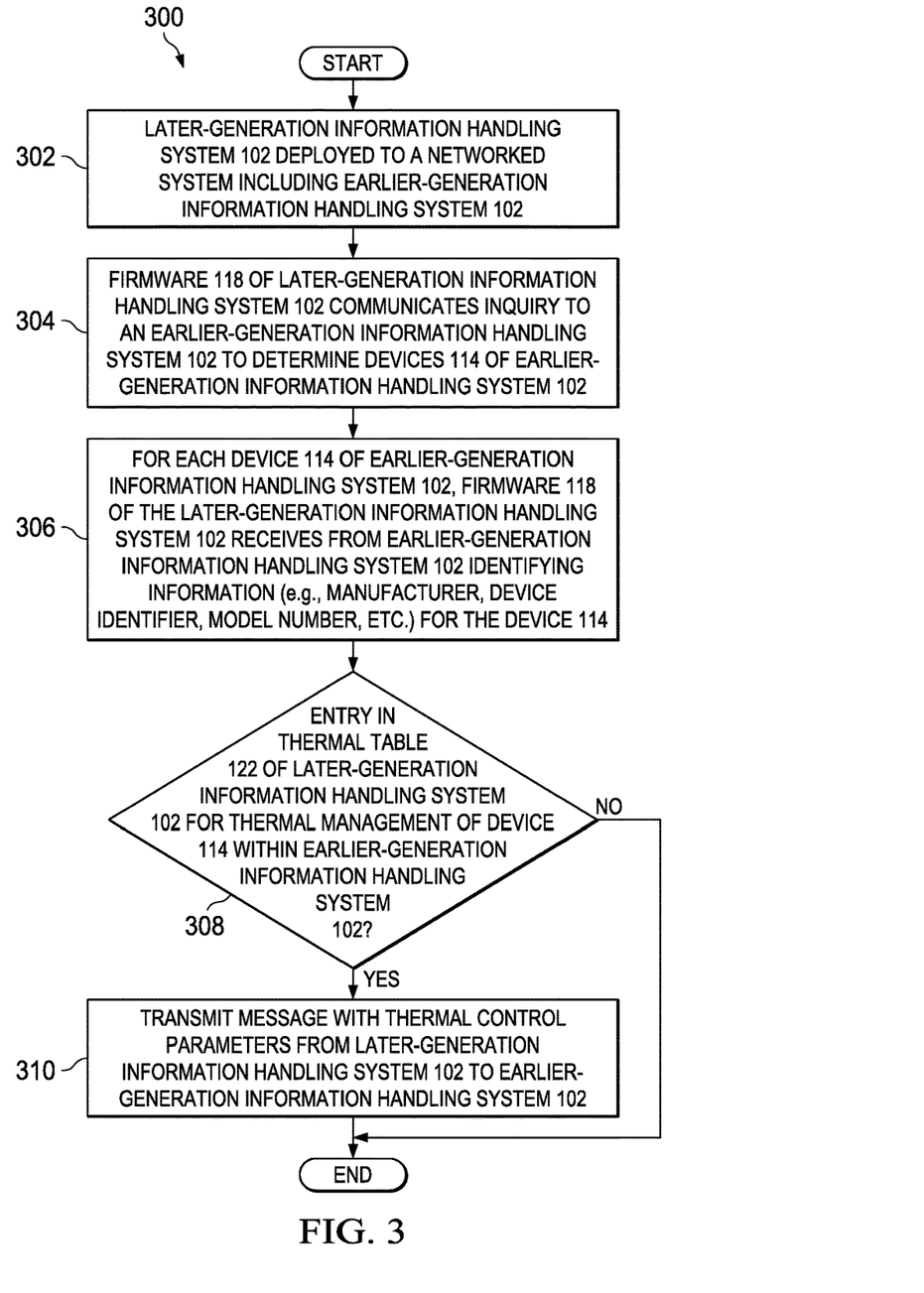
FIG. 3 illustrates a flow chart of another example method for providing thermal control support for a predecessor information handling system, in accordance with embodiments of the present disclosure.

FIG. 3 illustrates a flow chart of an example method 300 for providing thermal control support for a predecessor information handling system, in accordance with embodiments of the present disclosure. According to certain embodiments, method 300 may begin at step 302. As noted above, teachings of the present disclosure may be implemented in a variety of configurations of information handling systems 102. As such, the preferred initialization point for method 300 and the order of the steps comprising method 300 may depend on the implementation chosen. In these and other embodiments, method 300 may be implemented as firmware, software, applications, functions, libraries, or other instructions.

At step 302, a later-generation information handling system 102 may be deployed to a networked system (e.g., system 100) including at least one other earlier-generation information handling system 102. At step 304, firmware 118 of the later-generation information handling system 102 may communicate an inquiry to an earlier-generation information handling system 102 (e.g., via a management command, such as a command via Intelligent Platform Management Interface or other suitable standard or protocol) to determine which devices 114 exist within earlier-generation information handling system 102. For each discovered device 114, steps 306-310 below may be executed, as appropriate.

At step 306, for each device 114 of the earlier-generation information handling system 102, firmware 118 of the later-generation information handling system 102 may receive from the earlier-generation information handling system 102 identifying information (e.g., manufacturer, device identifier, model number, etc.) for the device 114. In some embodiments, such identifying information may be stored in a computer-readable medium integral to the device 114, which may be read by management controller 116 of the earlier-generation information handling system 102 and communicated to management controller 116 of the later-generation information handling system 102 via network 128.

At step 308, firmware 118 of the later-generation information handling system 102 may determine if it includes an entry in its own thermal table 122 for thermal management of such device 114 within the earlier-generation information handling system 102 (e.g., an entry including thermal parameters for thermal control of device 114 by information handling systems 102 of the same generation as the earlier-generation information handling system 102). If a match for the device 114 is found in the thermal table of the later-generation information handling system 102, method 300 may proceed to step 310. Otherwise, method 300 may end.

At step 310, firmware 118 of the later-generation information handling system 102 may frame a message including such thermal table 122 entry and communicate such message to the earlier-generation information handling system 102. Firmware 118 of the earlier-generation information handling system 102 may accept the message, extract the entry therefrom, store thermal parameters from the entry in its own thermal table 122, and apply the thermal parameters set forth in such entry in order to thermally control device 114. After completion of step 310, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using a management controller 116, components thereof or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a processor; and
   a management controller communicatively coupled to the processor, and having stored thereon:
   a thermal table comprising parameters for thermal management of one or more information handling resources of the information handling system and one or more information handling resources of at least one other information handling system; and
   firmware comprising instructions executable on the management controller and configured to:
      communicate an inquiry to a second management controller of an earlier-generation information handling system communicatively coupled to the management controller via a network to determine if the earlier-generation information handling system includes an information handling resource for which a second thermal table of the second management controller requires updated thermal control parameters for thermal control of the information handling resource; and
      responsive to determining that the earlier-generation information handling system includes the information handling resource for which a second thermal table of the second management controller requires updated thermal control parameters for thermal control of the information handling resource:
         read an entry from the thermal table associated with the information handling resource and a second information handling system including thermal control parameters for thermal control of the information handling resource by the second information handling system; and
         communicate the thermal control parameters for thermal control of the information handling resource by the second information handling system to the second management controller in order to update the second thermal table with the thermal control parameters.

2. The information handling system of claim 1, wherein determining that the earlier-generation information handling system includes the information handling resource for which the second thermal table of the second management controller requires updated thermal control parameters for thermal control of the information handling resource comprises determining that the second thermal table does not include an entry for thermal control of the information handling resource.

3. The information handling system of claim 1, wherein determining that the earlier-generation information handling system includes the information handling resource for which the second thermal table of the second management controller requires updated thermal control parameters for thermal control of the information handling resource comprises determining that the thermal table includes an entry for thermal control of the information handling resource by the second information handling system.

4. The information handling system of claim 1, wherein the information handling resource comprises a Peripheral Component Interconnect device.

5. The information handling system of claim 1, wherein the thermal control parameters comprise parameters for controlling a speed of an air mover.

6. The information handling system of claim 1, wherein the firmware further comprises instructions executable on the management controller and configured to, in response to determining that second thermal control parameters associated with a second information handling resource integral to the information handling system require updating, receive the second thermal control parameters from a third thermal table of a third management controller of a later-generation information handling system in order to update the thermal table with the second thermal control parameters.

7. A method comprising:
   communicating an inquiry from a first management controller of a later-generation information handling system to a second management controller of an earlier-generation information handling system communicatively coupled to the first management controller via a network to determine if the earlier-generation information handling system includes an information handling resource for which a second thermal table of the second management controller requires updated thermal control parameters for thermal control of the information handling resource; and responsive to determining that the earlier-generation information handling system includes the information handling resource for which a second thermal table of the second management controller requires updated thermal control parameters for thermal control of the information handling resource:

reading from a first thermal table of the first management controller an entry associated with the information handling resource and a second information handling system including thermal control parameters for thermal control of the information handling resource by the second information handling system; and communicating from the first management controller to the second management controller the thermal control parameters for thermal control of the information handling resource by the second information handling system in order to update the second thermal table with the thermal control parameters.

8. The method of claim 7, wherein determining that the earlier-generation information handling system includes the information handling resource for which the second thermal table of the second management controller requires updated thermal control parameters for thermal control of the information handling resource comprises determining that the second thermal table does not include an entry for thermal control of the information handling resource.

9. The method of claim 7, wherein determining that the earlier-generation information handling system includes the information handling resource for which the second thermal table of the second management controller requires updated thermal control parameters for thermal control of the information handling resource comprises determining that the thermal table includes an entry for thermal control of the information handling resource by the second information handling system.

10. The method of claim 7, wherein the information handling resource comprises a Peripheral Component Interconnect device.

11. The method of claim 7, wherein the thermal control parameters comprise parameters for controlling a speed of an air mover.

12. The method of claim 7, further comprising, in response to determining that second thermal control parameters associated with a second information handling resource integral to the later-generation information handling system require updating, receiving the second thermal control parameters from a third thermal table of a third management controller of a third information handling system of later generation than the later-generation information handling system order to update the first thermal table with the second thermal control parameters.

13. An article of manufacture, comprising;
a non-transitory computer readable medium; and
computer-executable instructions carried on the computer readable medium, the instructions readable by a processor, the instructions, when read and executed, for causing the processor to:

communicate an inquiry from a first management controller of a later-generation information handling system to a second management controller of an earlier-generation information handling system communicatively coupled to the first management controller via a network to determine if the earlier-generation information handling system includes an information handling resource for which a second thermal table of the second management controller requires updated thermal control parameters for thermal control of the information handling resource; and responsive to determining that the earlier-generation information handling system includes the information handling resource for which a second thermal table of the second management controller requires updated thermal control parameters for thermal control of the information handling resource:

read from a first thermal table of the first management controller an entry associated with the information handling resource and a second information handling system including thermal control parameters for thermal control of the information handling resource by the second information handling system; and communicate from the first management controller to the second management controller the thermal control parameters for thermal control of the information handling resource by the second information handling system in order to update the second thermal table with the thermal control parameters.

14. The article of claim 13, wherein determining that the earlier-generation information handling system includes the information handling resource for which the second thermal table of the second management controller requires updated thermal control parameters for thermal control of the information handling resource comprises determining that the second thermal table does not include an entry for thermal control of the information handling resource.

15. The article of claim 13, wherein determining that the earlier-generation information handling system includes the information handling resource for which the second thermal table of the second management controller requires updated thermal control parameters for thermal control of the information handling resource comprises determining that the thermal table includes an entry for thermal control of the information handling resource by the second information handling system.

16. The article of claim 13, wherein the information handling resource comprises a Peripheral Component Interconnect device.

17. The article of claim 13, wherein the thermal control parameters comprise parameters for controlling a speed of an air mover.

18. The article of claim 13, the instructions for further causing the processor to, in response to determining that second thermal control parameters associated with a second information handling resource integral to the later-generation information handling system require updating, receive the second thermal control parameters from a third thermal table of a third management controller of a third information handling system of later generation than the later-generation information handling system order to update the first thermal table with the second thermal control parameters.

* * * * *

UNITED STATES PATENT AND TRADEMARK OFFICE
CERTIFICATE OF CORRECTION

PATENT NO.        : 10,095,290 B2
APPLICATION NO.   : 15/163068
DATED             : October 9, 2018
INVENTOR(S)       : Ragupathi et al.

Page 1 of 1

It is certified that error appears in the above-identified patent and that said Letters Patent is hereby corrected as shown below:

In the Claims

Please amend Claim 12 as follows:
12. The method of Claim 7, further comprising, in response to determining that second thermal control parameters associated with a second information handling resource integral to the later-generation information handling system require updating, receiving the second thermal control parameters from a third thermal table of a third management controller of a third information handling system of later generation than the later-generation information handling system in order to update the first thermal table with the second thermal control parameters.

Please amend Claim 18 as follows:
18. The article of Claim 13, the instructions for further causing the processor to, in response to determining that second thermal control parameters associated with a second information handling resource integral to the later-generation information handling system require updating, receive the second thermal control parameters from a third thermal table of a third management controller of a third information handling system of later generation than the later-generation information handling system in order to update the first thermal table with the second thermal control parameters.

Signed and Sealed this
Fourth Day of December, 2018

Andrei Iancu
*Director of the United States Patent and Trademark Office*